Patented Aug. 16, 1938

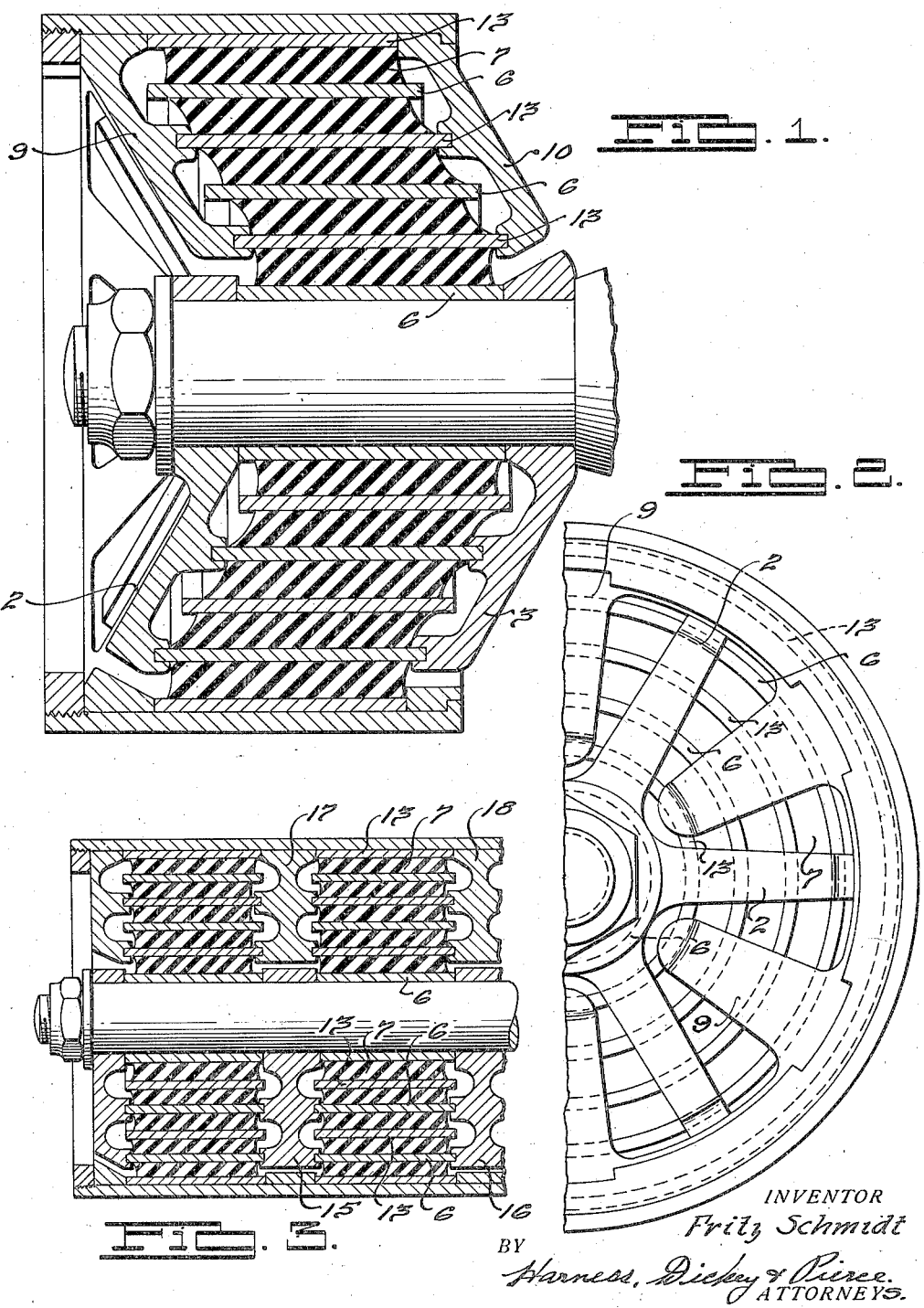

2,126,704

UNITED STATES PATENT OFFICE 2,126,704

RESILIENT CONNECTION

Fritz Schmidt, Harburg-Wilhelmsburg, Germany, assignor to Metalastik Ltd., Leicester, England, a British firm Application September 13, 1937, Serial No. 163,635
In Germany November 2, 1935

3 Claims. (Cl. 287—85)

The invention relates to the elastic suspension or mounting of engines for the purpose of damping the shocks and oscillations, created by this engine, in their transmission to the supporting part, in order to avoid detrimental influences. Known devices that have the same objective have the main drawback that with high loading the dimensions of the mounting cannot be suited to the needs for saving space, which, in aircraft construction for example, is an indispensable requirement. The object of the invention is to provide a device of relatively small volume, which has an absorption capacity for high pressure, and which in spite of this meets the requirements as regards elasticity in various directions.

The drawing illustrates one form of construction of the invention, wherein Fig. 1 shows a broken longitudinal section along the line A—B of Fig. 2, and Fig. 2 shows a front view, and Fig. 3 shows a modification of the invention.

To the loading or stressing part (lower half of Fig. 1), that is to the engine for example, there are attached pins 1, to which there are tightly clamped two spiders 2 and 3. The separate arms of these spiders, on the inner faces turned toward one another, have projections 4, in which are grooves 5 having the form of circular arcs. The grooves 5 hold the edges of metal rings 6 having the rubber mass 7 vulcanized to them. Opposite to the loading or stressing parts 1, 2, 3, 6, 7, there are disposed on the supporting part, an aircraft structure for example, sleeves 8, with inwardly directed spoke-like arms 9 and 10, which extend alternately with the arms 8 of the spiders 2 and 3 into the spaces of the latter respectively. The spokes 9 and 10 are also provided with grooved projections 11, 12 on their inner faces, and with them grip rings 13, which are alternated in radial sequence with the rings 6 carried by the spiders 2, 3. All the rings 6 and 13 are combined into a coherent element by means of the rubber masses 7 vulcanized in between them, and its elastic properties may be made useful in various ways for absorbing or dampening shocks and oscillations.

In the present case, which is illustrated by the drawing, this is effected by associating the rings in two groups 6 and 13, which are gripped by the stressing parts 1, 2, 3, or by the supporting parts 8, 9, 10, respectively, for the purpose of transmitting strong compression forces without exceeding the allowable stressing of rubber or the constructional dimensions fixed by technical and scientific requirements, and by the building specifications.

The frequently high load of stress in the pin 1 is transmitted to the arms 2 and 3 and the rings 6 (three in number according to the drawing), which are thus, so to speak, set parallel. The same thing is also the case for the rings 13 on the other side, which are connected by the arms 9 and 10 with the sleeve 8. Through this method of associating detail parts in groups, forces may be transmitted that with the usual known construction of the rubber-metal parts would require a greater constructional length with average diameter, proportional to the number of rings 6 or 13 associated in groups in the case considered. The strength or thickness of the intermediate rubber insert 7 is determined in individual cases in accordance with the degree of elasticity with which the shocks are transmitted between the parts 1 and 8, that is, depending upon whether they are to be damped in a soft or hard manner. The same thing applies for the length of the rubber inserts, whereby it should be taken into consideration that the resistance of rubber to shear is considerably less than to compression or tension.

The conical general form of the rubber-metal elements 6, 7, 13, which is illustrated in the drawing, is merely a form of construction necessitated by the shape of the adjacent parts. Under other conditions, and as a rule, the shape with plane front faces is to be preferred.

For special purposes, that is, for extraordinarily heavy stresses, the device may also be set in multiple axial sequence, whereby, for the purpose of saving space, each two adjacent pairs of parts 3 and 10 may be combined to form one pair. An arrangement for this purpose is shown in Fig. 3. In this figure, members 15, 16, 17 and 18, corresponding to the members 2, 3, 9 and 10 in Figure 1, have ring engaging means on axially opposite sides for engaging the rings.

What is claimed is:

1. A device for elastic suspension comprising an inner member, an outer member to support the inner member, concentric rings arranged in radial sequence and encircling the inner member, means on the outer member and connected to certain of the rings, means on the outer member and connected to others of the rings, and rubber between the rings and having fixed surface contact with the latter, each of said means engaging both axial edges of the rings connected thereto.

2. A device for elastic suspension comprising an inner member, an outer member to support the inner member, concentric rings arranged in radial sequence around the inner member, fingers extending radially on the inner member and connected to certain of the rings, other fingers on the outer member and disposed circumferentially between the fingers on the inner member and connected to others of the rings, and rubber masses between the rings and vulcanized thereto.

3. A device for elastic suspension comprising an inner member, an outer member to support the inner member, concentric rings arranged in radial sequence around the inner member, fingers extending radially on the inner member and connected to certain of the rings, other fingers on the outer member and disposed circumferentially between the fingers on the inner member and connected to others of the rings, and rubber masses between the rings and vulcanized thereto, said fingers extending radially along the axial edges of the rings and having slots in which their respective rings are engaged.

FRITZ SCHMIDT.